(12) United States Patent
Ye et al.

(10) Patent No.: US 11,964,677 B2
(45) Date of Patent: Apr. 23, 2024

(54) PLATFORM DOOR CONTROL APPARATUS BASED ON DOUBLE 2-VOTE-2 ARCHITECTURE

(71) Applicant: CASCO SIGNAL CO., LTD., Shanghai (CN)

(72) Inventors: Ruiyuan Ye, Shanghai (CN); Xiaolin Tang, Shanghai (CN); Liang Chen, Shanghai (CN); Zhijun Ji, Shanghai (CN); Chang Liu, Shanghai (CN); Chun Yang, Shanghai (CN); Xiaonan Liu, Shanghai (CN); Jing Xu, Shanghai (CN)

(73) Assignee: CASCO SIGNAL CO., LTD., Shanghai (CN)

( * ) Notice: Subject to any disclaimer, the term of this patent is extended or adjusted under 35 U.S.C. 154(b) by 898 days.

(21) Appl. No.: 16/978,425

(22) PCT Filed: Mar. 15, 2019

(86) PCT No.: PCT/CN2019/078249
§ 371 (c)(1),
(2) Date: Sep. 4, 2020

(87) PCT Pub. No.: WO2020/133723
PCT Pub. Date: Jul. 2, 2020

(65) Prior Publication Data
US 2021/0039683 A1   Feb. 11, 2021

(30) Foreign Application Priority Data

Dec. 27, 2018  (CN) .......................... 201811614542.2

(51) Int. Cl.
*B61B 1/02*     (2006.01)
*E05F 15/70*    (2015.01)
(Continued)

(52) U.S. Cl.
CPC ................ *B61B 1/02* (2013.01); *E05F 15/70* (2015.01); *G05B 19/4155* (2013.01);
(Continued)

(58) Field of Classification Search
CPC ........ B61B 1/02; E05F 15/70; E05Y 2400/45; E05Y 2900/60; G05B 19/4155; G05B 2219/31136; G07C 9/00309
See application file for complete search history.

(56) References Cited

FOREIGN PATENT DOCUMENTS

| CN | 201936169 U | 8/2011 |
|----|-------------|--------|
| CN | 102518352 A | 6/2012 |

(Continued)

OTHER PUBLICATIONS

International Search Report (in English and Chinese) and Written Opinion issued in PCT/CN2019/078249, dated May 27, 2019, 10 pages provided.

*Primary Examiner* — Robert J McCarry, Jr.
(74) *Attorney, Agent, or Firm* — HSML P. C.

(57) ABSTRACT

The present invention relates to a platform door control apparatus based on a double 2-vote-2 architecture, including a security communication and logic processing module, a driver collection module, and a maintenance module, the security communication and logic processing module is separately connected to the driver collection module and the maintenance module, and both the security communication and logic processing module and the driver collection module are devices using the double 2-vote-2 architecture. Compared with the prior art, the present invention has the following advantages of effectively improving linkage efficiency of a signal system and a platform door system, and the like.

8 Claims, 2 Drawing Sheets

(51) Int. Cl.
*G05B 19/4155* (2006.01)
*G07C 9/00* (2020.01)
(52) U.S. Cl.
CPC ...... *G07C 9/00309* (2013.01); *E05Y 2400/45* (2013.01); *E05Y 2900/60* (2013.01); *G05B 2219/31136* (2013.01)

(56) References Cited

FOREIGN PATENT DOCUMENTS

| | | | | | |
|---|---|---|---|---|---|
| CN | 102561880 | A | * | 7/2012 | ............ B61B 1/02 |
| CN | 102561880 | A | | 7/2012 | |
| CN | 104675262 | A | | 6/2015 | |
| CN | 107386868 | A | | 11/2017 | |
| EP | 2708432 | A1 | | 3/2014 | |
| KR | 1020100076157 | A | | 7/2010 | |

* cited by examiner

PLATFORM DOOR CONTROL APPARATUS BASED ON DOUBLE 2-VOTE-2 ARCHITECTURE

FIELD OF TECHNOLOGY

The present invention relates to platform door control apparatuses, and in particular, to a platform door control apparatus based on a double 2-vote-2 architecture.

BACKGROUND

An existing platform door system includes subsystems such as a central control panel (PSC), an integrated backup panel (IBP), a local control panel (PSL), and a door control unit (DCU). The platform door system can receive a signal command from an external signal system (SIG) or internally, execute an action corresponding to the command, and feed back a final execution result to the signal system.

A security relay interface is mainly used between the existing platform door system and the signal system. The signal system mainly includes an on-board system and a computer interlocking system. The on-board system controls a door opening relay to send a door opening command to the platform door system, and controls a door closing relay to send a door closing command to the platform door system. The platform door system controls and turns off a locking relay to send statuses of all platform doors to the on-board system and the computer interlocking system. Under abnormal circumstances, after the platform door system deactivates interlocking, the platform door system controls an interlocking deactivation relay to transmit an interlocking deactivation signal to the computer interlocking system.

The existing platform door system mainly has the following disadvantages:
(1) Before arriving at a platform door, an on-board command needs to go through an interlocking computer, a relay circuit, the central control panel, the door control unit, and finally a driver shielding door. There are too many actions and a long delay is caused.
(2) There are a large quantity of interfaces between the signal system and the platform door system, it is inconvenient to query and deal with faults, and it is inconvenient to upgrade a subsequent station.
(3) There is no redundant design in the relay circuit. When a single-point fault occurs, operation of the entire system is affected. In this way, reliability is not high.

SUMMARY

To overcome disadvantages in the prior art, an objective of the present invention is to provide a platform door control apparatus based on a double 2-vote-2 architecture.

The objective of the present invention can be implemented by using the following technical solutions.

A platform door control apparatus based on a double 2-vote-2 architecture is provided, including a security communication and logic processing module, a driver collection module, and a maintenance module, the security communication and logic processing module is separately connected to the driver collection module and the maintenance module, and both the security communication and logic processing module and the driver collection module are devices using the double 2-vote-2 architecture.

Preferably, the security communication and logic processing module is provided with a red and blue redundant network, and establishes a direct communication connection to an interlocking system and an on-board system through the red and blue redundant network.

Preferably, the security communication and logic processing module includes a first CPU, a second CPU, a first FPGA, and a second FPGA, the first CPU is connected to the first FPGA, the second CPU is connected to the second FPGA, and the first CPU is connected to the second CPU, to form the double 2-vote-2 architecture; and the security communication and logic processing module performs a security logic operation, to effectively manage a logical relationship between an on-board command, an integrated backup panel, and a local control panel.

Preferably, the driver collection module is directly connected to a door control unit, sends a door opening/closing command to the door control unit, and is capable of collecting a status of a platform door.

Preferably, the driver collection module includes a double 2-vote-2 processor module, a CAN communications module, a collection module, a driver module, an isolation module, and a fuse module, the double 2-vote-2 processor module is separately connected to the CAN communications module, the collection module, the driver module, the isolation module, and the fuse module, and the isolation module is separately connected to the driver module and the fuse module.

Preferably, the double 2-vote-2 processor module includes a third CPU, a fourth CPU, a third FPGA, and a fourth FPGA, the third CPU is connected to the third FPGA, the fourth CPU is connected to the fourth FPGA, and the third CPU is connected to the fourth CPU, to form the double 2-vote-2 architecture.

Preferably, the driver collection module is separately connected to an integrated backup panel and a local control panel, and is capable of directly collecting a control command sent by the integrated backup panel and the local control panel.

Preferably, when a fault occurs on the driver module, the isolation module cuts off power supply to the driver module; and when a fault occurs on the isolation module, the fuse module blows the fuse, leading to a secure state.

Preferably, both the security communication and logic processing module and the driver collection module use a BIT technology, and are self-checking modules that are capable of periodically checking security devices on the security communication and logic processing module and the driver collection module.

Compared with the prior art, the present invention has the following advantages:
(1) The present invention is deeply integrated with a platform door system, which effectively improves linkage efficiency of a signal system and the platform door system, accelerates reaction of the platform door, and can further shorten a driving interval.
(2) Interfaces between the platform door system and the signal system are reduced, maintenance and management costs are reduced, and subsequent upgrades are facilitated.
(3) The driver collection module, the communications module, and the logic processing module based on a 2-vote-2 architecture and the BIT technology are used to ensure secure and stable operation of the system.
(4) A 2-by-2 redundant design is used, and operation of the platform door system is not affected when a fault occurs on a single module, and system operation availability is improved.
(5) A security range of a signal control shielding door is extended, a platform-level shielding door control part is incorporated into a security product management scope, and security of a platform door controller is improved.

DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. Based on the embodiments of the present invention, all the other embodiments obtained by those of ordinary skill in the art without inventive effort shall fall within the protection scope of the present invention.

Figure 1:
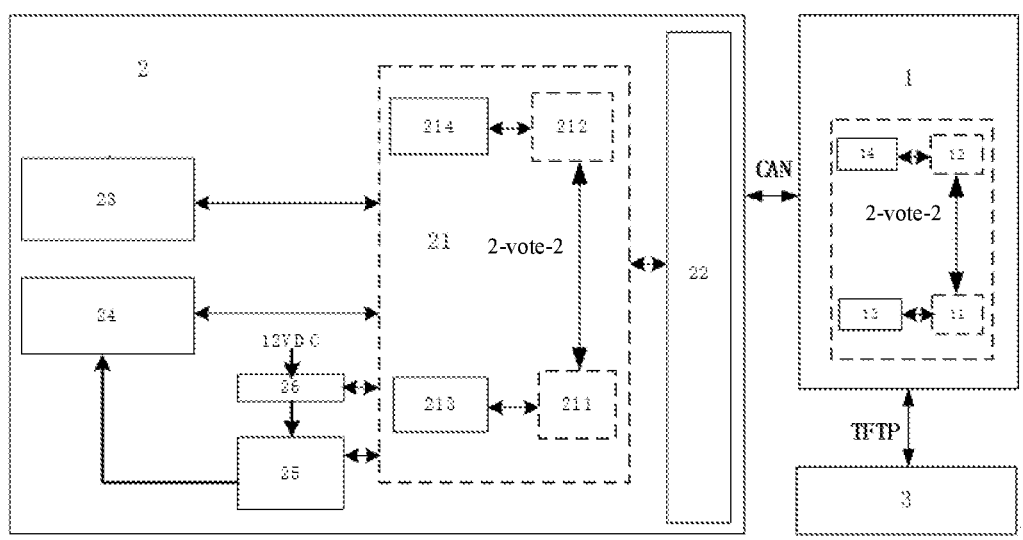
FIG. 1 is a schematic structural diagram according to the present invention.

As shown in FIG. 1, a platform door control apparatus based on a double 2-vote-2 architecture is provided, including a security communication and logic processing module 1, a driver collection module 2, and a maintenance module 3, the security communication and logic processing module 1 is separately connected to the driver collection module 2 and the maintenance module 3, and both the security communication and logic processing module 1 and the driver collection module 2 are devices using the double 2-vote-2 architecture.

The security communication and logic processing module is provided with a red and blue redundant network, and establishes a direct communication connection to an interlocking system and an on-board system through the red and blue redundant network.

The security communication and logic processing module 1 includes a first CPU 11, a second CPU 12, a first FPGA 13, and a second FPGA 14, the first CPU 11 is connected to the first FPGA 13, the second CPU 12 is connected to the second FPGA 14, and the first CPU 11 is connected to the second CPU 12, to form the double 2-vote-2 architecture. The security communication and logic processing module performs a security logic operation, to effectively manage a logical relationship between an on-board command, an integrated backup panel, and a local control panel.

The driver collection module is directly connected to a door control unit, sends a door opening/closing command to the door control unit, and is capable of collecting a status of a platform door.

The driver collection module includes a double 2-vote-2 processor module 21, a CAN communications module 22, a collection module 23, a driver module 24, an isolation module 25, and a fuse module 26, the double 2-vote-2 processor module 21 is separately connected to the CAN communications module 22, the collection module 23, the driver module 24, the isolation module 25, and the fuse module 26, and the isolation module 25 is separately connected to the driver module 24 and the fuse module 26. The double 2-vote-2 processor module 21 includes a third CPU 211, a fourth CPU 212, a third FPGA 213, and a fourth FPGA 214, the third CPU 211 is connected to the third FPGA 213, the fourth CPU 212 is connected to the fourth FPGA 214, and the third CPU 211 is connected to the fourth CPU 212, to form the double 2-vote-2 architecture. A CPU receives a door opening/closing command transmitted by the security communication and logic processing module, and controls, by using an FPGA, a relay control unit to drive a relay to pick up and drop. The CPU controls a collection module relay by using the FPGA, to collect platform door status information and control information sent by the PSL and the IBP, and sends the information to the CPU by using the FPGA.

The driver collection module is separately connected to the integrated backup panel and the local control panel, and is capable of directly collecting a control command sent by the integrated backup panel and the local control panel.

When a fault occurs on the driver module, the isolation module cuts off power supply to the driver module; and when a fault occurs on the isolation module, the fuse module blows the fuse, leading to a secure state.

Both the security communication and logic processing module and the driver collection module use a BIT technology, and are self-checking modules that are capable of periodically checking security devices on the security communication and logic processing module and the driver collection module.

The security communication and logic processing module and the driver collection module are connected through a CAN bus, and the security communication and logic processing module receives, from the driver collection module, the platform door status information and the control information sent by the PSL and the IBP, to effectively manage the door opening/closing command.

The security communication and logic processing module and the maintenance module are connected through a network cable, and the maintenance module collects maintenance and alarm information from the security communication and logic processing module.

Figure 2:
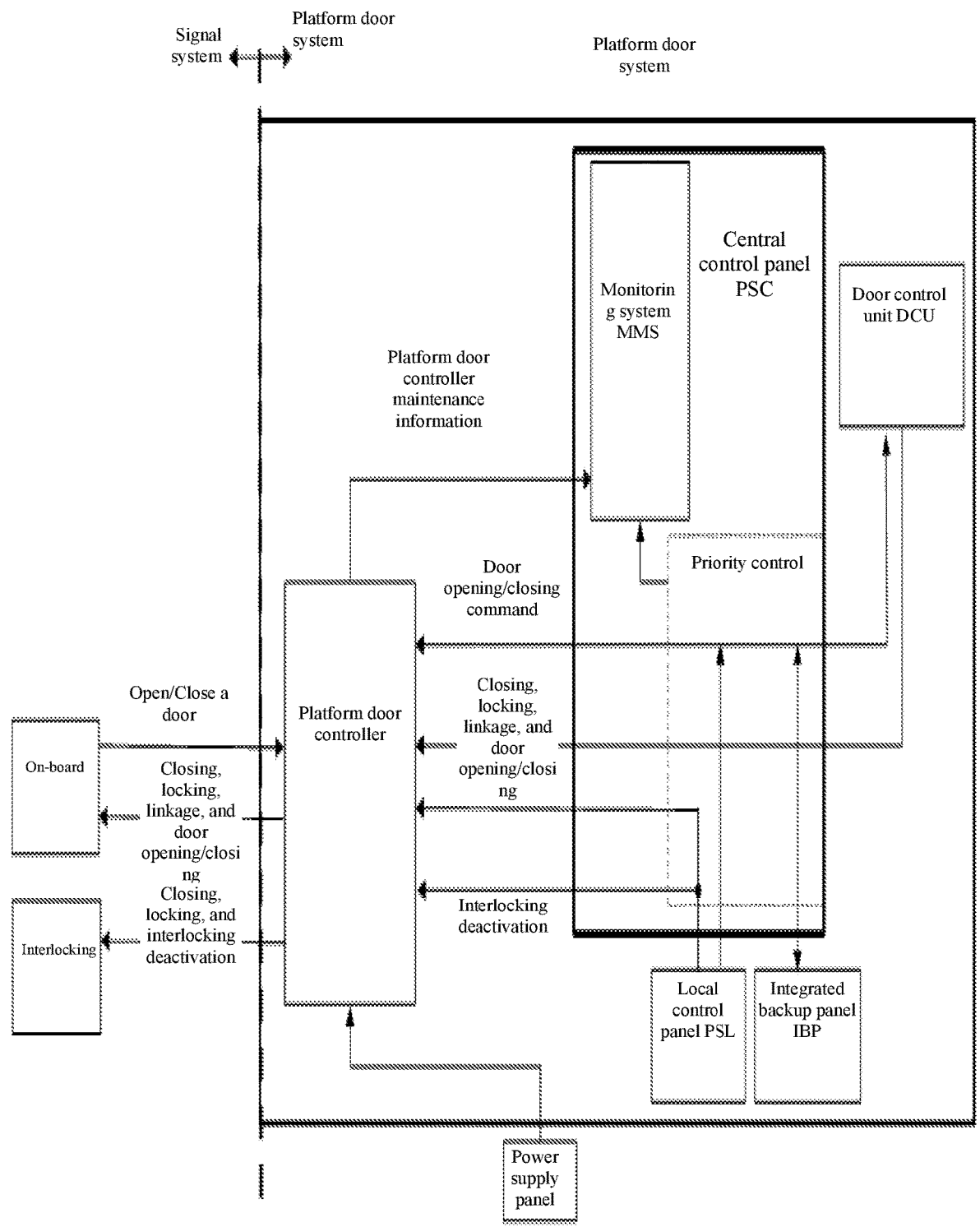
FIG. 2 is a diagram of connecting a platform door system and a signal system after the present invention is used.

FIG. 2 is a diagram of connecting a platform door system and a signal system after the present invention is used. A platform door controller directly communicates with an on-board system and an interlocking system, and is directly connected to a door control unit through a hard wire.

During normal operation, after a train arrives at a station, a door opening/closing instruction is sent by using an on-board signal. After receiving a control command, the platform door controller directly transmits the command to the door control unit through a hard wire, thereby controlling a platform door. The platform door controller collects a platform door closing and locking signal to obtain a closed state of all platform doors, and sends the signal to the on-board system and the interlocking system.

In a case that a fault occurs on the platform door, after the platform door system deactivates interlocking, the platform door controller may collect an interlocking deactivation signal from a PSL, and send the interlocking deactivation signal to the interlocking system.

In an emergency, when manual intervention is performed to control door opening and closing by using the PSL or an IBP, the platform door controller can collect a control command from the PSL and IBP for avoidance, thereby achieving priority control.

In addition, the platform door controller can further collect a linkage door opening/closing command from the PSL, to implement a linkage operation between a train door and the platform door.

The platform door system directly sends the maintenance and alarm information to a platform door monitoring system.

What is mentioned above is only the specific implementation of the present invention, but does not limit the protection scope of the present invention, and anyone skilled in the art can easily think of mortifications and alternations within the technical scope disclosed by the present invention, all of which shall fall within the protection scope of the present invention. Therefore, the protection scope of the present invention shall be subject to the protection scope of the claims.

What is claimed is:

1. A platform door control apparatus based on a double 2-vote-2 architecture, comprising:
 a security communication and logic processing module,
 a driver collection module, and
 a maintenance module,
 the security communication and logic processing module is separately connected to the driver collection module and the maintenance module, and both the security communication and logic processing module and the driver collection module are devices using the double 2-vote-2 architecture,
 wherein the driver collection module comprises a double 2-vote-2 processor module, a CAN communications module, a collection module, a driver module, an isolation module, and a fuse module, the double 2-vote-2 processor module is separately connected to the CAN communications module, the collection module, the driver module, the isolation module, and the fuse module, and the isolation module is separately connected to the driver module and the fuse module.

2. The platform door control apparatus based on the double 2-vote-2 architecture according to claim 1, wherein the security communication and logic processing module is provided with a red and blue redundant network, and establishes a direct communication connection to an interlocking system and an on-board system through the red and blue redundant network.

3. The platform door control apparatus based on the double 2-vote-2 architecture according to claim 1, wherein the security communication and logic processing module comprises a first CPU, a second CPU, a first FPGA, and a second FPGA, the first CPU is connected to the first FPGA, the second CPU is connected to the second FPGA, and the first CPU is connected to the second CPU, to form the double 2-vote-2 architecture; and
 the security communication and logic processing module performs a security logic operation, to effectively manage a logical relationship between an on-board command, an integrated backup panel, and a local control panel.

4. The platform door control apparatus based on the double 2-vote-2 architecture according to claim 1, wherein the driver collection module is directly connected to a door control unit, sends a door opening/closing command to the door control unit, and is capable of collecting a status of a platform door.

5. The platform door control apparatus based on the double 2-vote-2 architecture according to claim 1, wherein the double 2-vote-2 processor module comprises a third CPU, a fourth CPU, a third FPGA, and a fourth FPGA, the third CPU is connected to the third FPGA, the fourth CPU is connected to the fourth FPGA, and the third CPU is connected to the fourth CPU, to form the double 2-vote-2 architecture.

6. The platform door control apparatus based on the double 2-vote-2 architecture according to claim 1, wherein the driver collection module is separately connected to an integrated backup panel and a local control panel, and is capable of directly collecting a control command sent by the integrated backup panel and the local control panel.

7. The platform door control apparatus based on the double 2-vote-2 architecture according to claim 1, wherein when a fault occurs on the driver module, the isolation module cuts off power supply to the driver module; and when a fault occurs on the isolation module, the fuse module blows the fuse, leading to a secure state.

8. The platform door control apparatus based on the double 2-vote-2 architecture according to claim 1, wherein both the security communication and logic processing module and the driver collection module use a BIT technology, and are self-checking modules that are capable of periodically checking security devices on the security communication and logic processing module and the driver collection module.

* * * * *